(12) United States Patent
Scroggins et al.

(10) Patent No.: US 10,065,871 B2
(45) Date of Patent: Sep. 4, 2018

(54) WASTEWATER TREATMENT SYSTEM

(71) Applicant: BluMetric Environmental Inc., Ottawa (CA)

(72) Inventors: Danny Lee Scroggins, Seneca Falls, NY (US); Ross Edward McDonald, Verona (CA); Erik Hefler Donaldson, Toronto (CA)

(73) Assignee: BluMetric Environmental Inc., Ottawa (CA)

( * ) Notice: Subject to any disclaimer, the term of this patent is extended or adjusted under 35 U.S.C. 154(b) by 5 days.

(21) Appl. No.: 15/241,718

(22) Filed: Aug. 19, 2016

(65) Prior Publication Data
US 2017/0050872 A1    Feb. 23, 2017

Related U.S. Application Data

(60) Provisional application No. 62/207,754, filed on Aug. 20, 2015.

(51) Int. Cl.
*C02F 1/42* (2006.01)
*C02F 1/20* (2006.01)
(Continued)

(52) U.S. Cl.
CPC ............ *C02F 1/42* (2013.01); *C02F 1/20* (2013.01); *C02F 1/66* (2013.01); *C02F 3/006* (2013.01);
(Continued)

(58) Field of Classification Search
CPC ...... C02F 1/42; C02F 1/20; C02F 1/66; C02F 3/006; C02F 3/1273; C02F 3/20;
(Continued)

(56) References Cited

U.S. PATENT DOCUMENTS 4,746,435 A * 5/1988 Onishi .................. B01D 53/22
 210/150
2008/0073265 A1* 3/2008 Abma .................. C02F 1/5254
 210/605
(Continued)

FOREIGN PATENT DOCUMENTS

CA      2939406 A1 *  2/2017

*Primary Examiner* — Fred Prince
(74) *Attorney, Agent, or Firm* — Borden Ladner Gervais LLP

(57) ABSTRACT

In a process for the treatment of wastewater containing carbonaceous and nitrogenous contaminants, wastewater is mixed with aerobic microorganisms capable of converting carbonaceous biological oxygen demand (CBOD) into carbon dioxide, water, and biological cell mass. Oxygen is supplied to the reaction mixture for supporting reduction of the CBOD by the aerobic microorganisms in the reaction mixture. To substantially prevent nitrification of the nitrogenous contaminants in the reaction mixture and avoid the cost of downstream denitrification, the hydraulic residence time of the nitrogenous contaminants in the reaction mixture is controlled by removing partially treated water with dissolved ammonia from the reaction mixture, while retaining the biological cell mass in the reaction mixture. This separates the nitrogen load from the carbon load and enables independent treatment of these contaminants. The ammonia is scrubbed from the partially treated water to create fully treated water which is disposed or returned to the reaction mixture.

19 Claims, 10 Drawing Sheets

(51) Int. Cl.
*C02F 1/66* (2006.01)
*C02F 3/00* (2006.01)
*C02F 3/12* (2006.01)
*C02F 3/20* (2006.01)

(52) U.S. Cl.
CPC .............. *C02F 3/1273* (2013.01); *C02F 3/20* (2013.01); *C02F 2209/001* (2013.01); *C02F 2209/005* (2013.01); *C02F 2209/06* (2013.01); *C02F 2209/08* (2013.01); *C02F 2209/14* (2013.01); *C02F 2209/22* (2013.01); *C02F 2209/40* (2013.01); *C02F 2209/44* (2013.01); *Y02W 10/15* (2015.05)

(58) Field of Classification Search
CPC .............. C02F 2209/22; C02F 2209/40; C02F 2209/005; C02F 2209/001; C02F 2209/06; C02F 2209/08; C02F 2209/14; C02F 2209/44; Y02W 10/15
USPC ....... 210/608, 614, 615, 621, 622, 252, 259, 210/903, 916
See application file for complete search history.

(56) References Cited

U.S. PATENT DOCUMENTS

2009/0039015 A1* 2/2009 Baba ..................... C02F 3/1226
                                                                                 210/605
2014/0217018 A1* 8/2014 Dobie ..................... C02F 3/006
                                                                                  210/614

* cited by examiner

WASTEWATER TREATMENT SYSTEM

RELATED APPLICATIONS

This application claims priority from Provisional U.S. Patent Application No. 62/207,754, which was filed on Aug. 20, 2015, and is incorporated herein by reference.

FIELD OF THE INVENTION

The present invention relates generally to wastewater treatment and in particular to residential, industrial and municipal waste water treatment processes and systems.

BACKGROUND

Most wastewater contains organic contaminants that fall into two groups; carbonaceous, which is derived from sugars, starches and other carbohydrates, and nitrogenous, which comes from the degradation of more complex compounds, such as proteins and amino acids, into ammonia. Most conventional treatment systems address these contaminants separately by using different species of aerobic microorganisms which can use the contaminants as food source. Generally, naturally occurring microorganisms are used and maintained in an environment that keeps them in intimate contact with the food source and provides them with enough oxygen to support their metabolism as they reduce or oxidize the contaminants.

Most conventional biological treatment plants use an activated sludge process to accomplish this oxidation and reduction of the organic material. The conventional activated sludge process and its many variations has been the industry standard for over fifty years. A variable depth reactor is generally used to operate a variation of the activated sludge process to biologically convert carbonaceous biological oxygen demand (CBOD) into carbon dioxide, water, and biological cell mass. This conversion happens rapidly as the sugars and starches present in the wastewater are absorbed by the microorganisms in the activated sludge.

The biological oxidation of nitrogen compounds, specifically ammonia, into nitrates is accomplished by a different group of microorganisms that do not become the predominant species until the easier to consume food (CBOD) has been reduced. Therefore, this nitrification step takes place as a secondary reaction, but only after the bulk of the CBOD has been reduced. Generally, the nitrification step takes place either separately in a second reactor, or in conjunction with the CBOD reduction in a much larger single reactor. The nitrate generated in the nitrification step has been found to have a detrimental impact, in particular on aqueous environments. Therefore, although many existing municipal regulations require only CBOD reduction and ammonia oxidation for wastewater treatment, growing environmental concerns have led to increasing demands for further treatment of the nitrified wastewater. Known de-nitrification processes use yet another set of different, anoxic microorganism, which are able to pull oxygen from the nitrate (NO3) and liberate nitrogen gas into the atmosphere. This removes the nitrogen based nutrients from the wastewater. However, the de-nitrification process is complicated and requires the addition of a carbon based food source to satisfy the metabolic needs of the anoxic microorganisms as they break the nitrate.

In conventional systems, treatment of the wastewater to reduce the CBOD and nitrogen based nutrients requires the use of four treatment vessels, an aeration basin for the CBOD reduction process, a nitrification basin, an anoxic de-nitrification basin and an aerobic basin. The hydraulic capacities of the aeration, nitrification, anoxic de-nitrification and aerobic basins is commonly 1×, 0.25×, 0.25× and 0.25×. If the CBOD reduction and nitrification steps are carried out in the same reactor, the hydraulic capacity of the required reactor basins is 1.5×, 0.25× and 0.25×. Consequently, the nitrification and de-nitrification process adds significantly to the complexity and cost of the overall system.

SUMMARY OF THE INVENTION

It is now an object of the invention to address at least one of the disadvantages of prior art wastewater treatment systems and methods.

In one aspect, the invention provides a wastewater treatment process, wherein the CBOD reduction step is not only separate from the nitrification and de-nitrification steps, the nitrification and de-nitrification steps are completely omitted. In this process, the CBOD reduction is carried out in a reactor and the hydraulic retention of the ammonia in the reactor is controlled to minimize and preferably prevent oxidation of ammonia in the wastewater. Water and dissolved ammonia are removed from the reactor at a rate which minimizes and preferably substantially prevents oxidation of the ammonia in the wastewater into $NO_2$ and $NO_3$.

In a preferred embodiment, the present process for the treatment of wastewater containing carbonaceous and nitrogenous contaminants includes the steps of mixing the wastewater in a reactor with aerobic microorganisms capable of converting carbonaceous biological oxygen demand (CBOD) into carbon dioxide, water, and biological cell mass; supplying oxygen to the resulting reaction mixture for supporting reduction of the CBOD by the aerobic microorganisms in the reactor; controlling a hydraulic residence time in the reactor for substantially preventing nitrification of the nitrogenous contaminants in the reactor; and removing partially treated water with dissolved ammonia from the reactor, while retaining the biological cell mass in the reactor. The reactor used is preferably a variable depth reactor (VDR).

The process preferably includes the further steps of separating the ammonia from the partially treated water to generate fully treated water; and recycling at least a portion of the fully treated water to the reactor. Separating the ammonia from the partially treated water can be achieved by using an ion selective resin, to bind the ammonia to the resin and generate the fully treated water.

In order to enhance the process, the pH of the reaction mixture is preferably closely monitored and adjusted to 7.0 to 8.0, to buffer the reduction caused by the production of carbon dioxide and the resultant weak acid. To obtain an even higher degree of ammonia removal the pH of the reaction mixture is preferably adjusted to about 7, because at that pH more of the ammonia will be present in the form of NH4 ammonium which is more susceptible to adsorption by the ion exchange resin. The oxidation reduction potential (ORP) is also preferably measured as a method to gauge the consumption or reduction of the CBOD, along with the dissolved oxygen (DO) to ensure the reaction mixture remains aerobic. The ammonia concentration is also monitored to make sure the activated sludge is only reducing the CBOD and not nitrifying or oxidizing the ammonia.

The ion selective resin is preferably regenerated by washing the ion selective resin with a brine solution. The spent regenerated or dirty brine solution is collected in a separate vessel, where the pH is raised to 10.5 to convert $NH_4$ to the more volatile $NH_3$ and thereby volatilize the ammonia from the brine solution. The generated ammonia gas can then be vented to the atmosphere. Alternatively, the ammonia gas is reclaimed in the form of an ammonium sulfate or ammonium nitrate solution in a reclaimer arrangement. This is preferably achieved with an ammonia scrubber/reclaimer with a nitric acid or sulfuric acid shower to form the ammonium sulfate or ammonium nitrate solution. The ammonium sulfate or ammonium nitrate solution can be used as a raw material for the chemical or fertilizer industry.

The contact activator tank of the variable depth reactor is preferably aggressively aerated in order to maintain a dissolved oxygen concentration of at least 2.0 mg/l and adequately mix the contents to keep the incoming food in contact with the biomass.

In the present process, the ammonia is directly removed from the reaction mixture to eliminate the complex and costly nitrification and de-nitrification steps. The CBOD is reduced without first oxidizing the ammonia. The ammonia is preferably selectively removed by adsorption on an ion selective resin. The segregation and independent treatment of the ammonia reduces the size and cost associated with the equipment for traditional nitrification and de-nitrification processes. The elimination of the nitrification and de-nitrification steps reduces the complexity and operating cost compared to traditional systems. The use of the ammonia re-claimer allows the capture and recycling of a contaminant for beneficial reuse.

In another aspect, the invention provides a system for the treatment of wastewater containing carbonaceous and nitrogenous contaminants. The system preferably includes a variable depth reactor (VDR) for mixing the wastewater with aerobic microorganisms capable of converting carbonaceous biological oxygen demand (CBOD) into carbon dioxide, water, and biological cell mass and for supplying oxygen to the aerobic microorganisms for supporting reduction of the CBOD by the aerobic microorganisms in the reactor. The system further includes a hydraulic residence control for controlling the hydraulic residence time of the nitrogenous contaminants in the reaction mixture in order to substantially prevent nitrification of the nitrogenous contaminants in the reactor. A solid/liquid separator is preferably provided for the removal of partially treated water with dissolved ammonia from the reaction mixture, while the biological cell mass is returned to the reaction mixture. The separator is preferably a membrane bioreactor (MBR). The use of a variable depth reactor (VDR) in combination with a membrane bioreactor (MBR) and ion-selective technology provides for a high quality effluent in a cost-effective manner.

The hydraulic residence control preferably includes an ammonia sensor for monitoring a concentration of the nitrogenous contaminants in the reaction mixture and a regulator for controlling a rate of withdrawal of the partially treated water from the reaction mixture in the variable depth reactor. The hydraulic residence control preferably further includes an oxidation reduction potential (ORP) sensor and a dissolved oxygen (DO) sensor for assessing a rate of consumption or reduction of the CBOD in the reaction mixture.

The system preferably further includes an ammonia separator for separating the ammonia from the partially treated water and generating fully treated water. The ammonia separator preferably includes an ion selective resin for binding of the ammonia and generating the fully treated water. A conduit can be provided for recycling at least a portion of the fully treated water to the variable depth reactor.

The ammonia separator preferably further includes a reactor for regenerating the ion selective resin with a brine solution for reconstituting the resin and capturing the ammonia, a module for volatilizing the ammonia from the brine solution to generate ammonia gas and a conduit for venting the ammonia gas to the atmosphere. Alternatively, the ammonia separator may include an ammonia re-claimer for reclaiming the ammonia gas in the form of an ammonium sulfate or ammonium nitrate solution. The module for volatilizing the ammonia is preferably an ammonia scrubber for changing a state of the ammonia at an elevated pH and volatilize the ammonia. The re-claimer is preferably a nitric acid or sulfuric acid scrubber for capturing the ammonia gas in form an ammonium sulfate or ammonium nitrate solution.

In a further embodiment, the system includes a second ammonia separator for facilitating separation of the nitrogen load from the carbon load and to allow treatment of the nitrogen load independently from the carbon load. The second separator can be located in the activator tank, or in the reactor. The second separator is used for lowering the ammonia level in the reaction mixture in situations where control of the hydraulic residence time in the reactor is insufficient to prevent nitrification of nitrogenous contaminants at high ammonia levels in the reaction mixture.

In another embodiment, the system includes a programmable logic controller (PLC) for controlling the overall operation of the system. The PLC receives data from the pH, DO, ORP and NH3 probes, determines an amount of partially treated water which must be removed from the reaction mixture for achievement of a preselected ammonia content in the reaction mixture and operates one or more pumps to achieve that flow. The preselected ammonia content is sufficient to support microbial CBOD reduction. In a dual separator system, the PLC determines and controls the flow of water which must be removed from each separator.

DETAILED DESCRIPTION OF EXEMPLARY EMBODIMENTS

Figure 1:
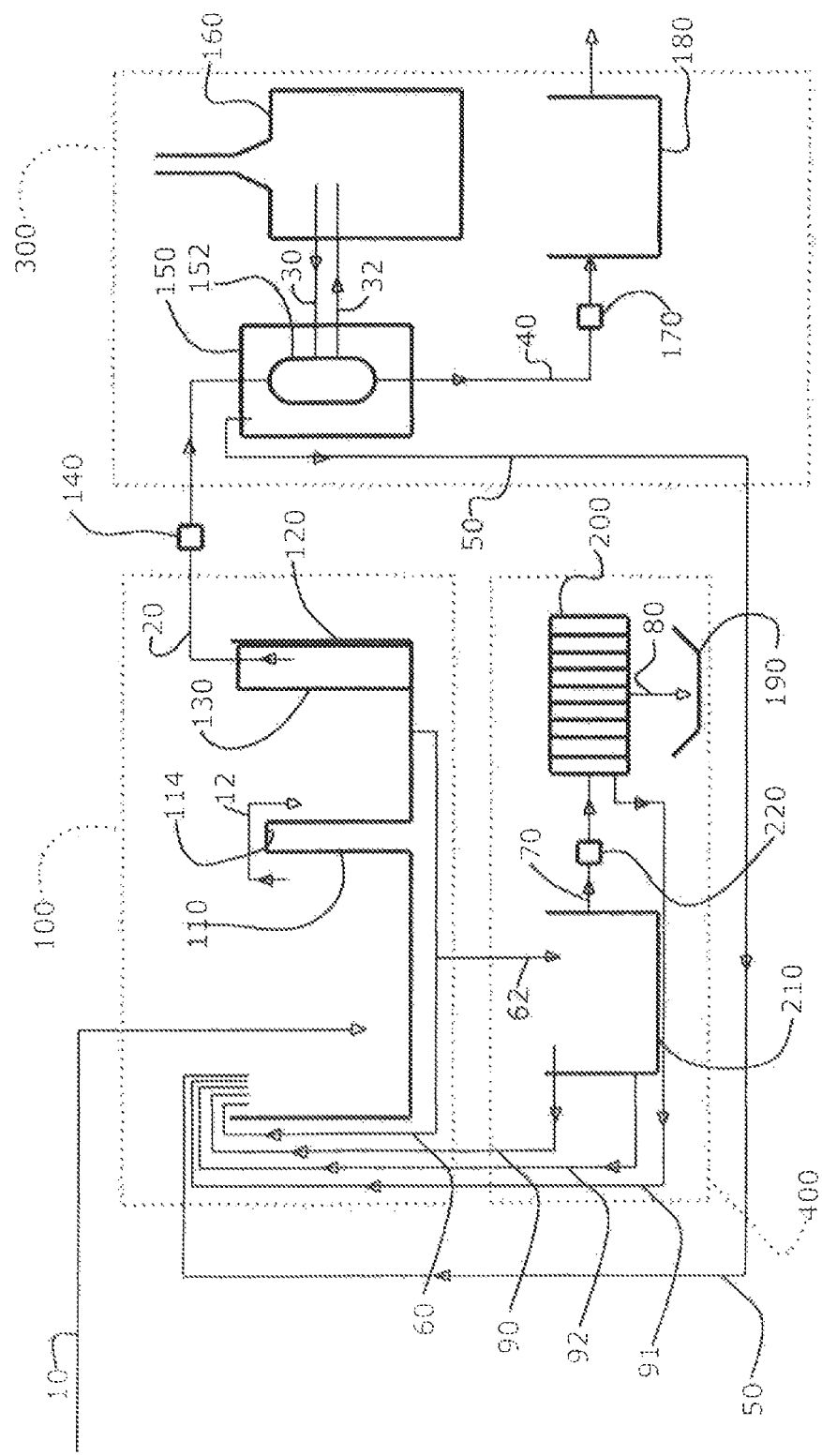
FIG. 1 schematically illustrates an overview of an exemplary process in accordance with the invention.

Exemplary embodiments of processes and systems in accordance with the invention are described in the following with reference to the attached drawings.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing an exemplary implementation of the various embodiments described herein.

The present process was developed to directly remove ammonia from wastewater and eliminate the complex and costly nitrification and de-nitrification steps.

The present process uses a conventional variable depth reactor and the known activated sludge process which was modified to reduce the CBOD without oxidation of the ammonia. The system uses a membrane to retain the biological cell mass and other contaminants and to produce a clear effluent with ammonia being the remaining contaminant. This separates the nitrogen load from the carbon load and allows treatment of the carbonaceous contaminants separately from the nitrogenous contaminants. The ammonia is then selectively removed from the clear effluent, preferably by adsorption on an ion selective resin.

In general terms, the present system, as schematically illustrated in FIG. 1, includes a variable depth reactor 100, an ammonia separation arrangement 300 for the separation and conditioning of the dissolved ammonia 300 and a solids treatment arrangement 400. The variable depth reactor 100 includes a contact activator tank (CAT) 110 (BluMetric Environmental) for receiving the raw wastewater 10 to be treated and a membrane bioreactor (MBR) 120 (BluMetric Environmental). Conditioned mixed liquor 12 in the CAT 110 flows past an overflow gate 114 and into the MBR 120 for solid/liquid separation. The MBR 120 includes a separator membrane 130 (FN polyethersulfone membranes manufactured by LG) for retaining all solids above a desired size and for separation of the conditioned mixed liquor into a solids retentate 18 and a liquid permeate 20 in the form of partially treated wastewater with dissolved ammonia. A conveyor pump 140 is used to control the rate of removal of the permeate 20 from the membrane bioreactor 120. The conveyor pump 140 feeds the permeate 20, to the ammonia separation arrangement 300 for removal of the dissolved ammonia from the permeate. After removal of the dissolved ammonia, the waste water treatment is complete and fully treated waste water 40 exiting the separator 150 is supplied by a drainage pump 170 to an optional holding tank 180 and then released into the environment or returned to the VDR. The separation arrangement 300 includes an ammonia separator 150, containing an ion selective resin charge 152 for capture of the dissolved ammonia. Ammonia captured by the resin charge 152 is removed from the separator 150 with a brine solution 30 which releases the captured ammonia from the resin charge 152. After passage over the resin charge 152, the spent brine solution is loaded with dissolved ammonia. The spent brine solution 32 is supplied to a scrubber 160 for liberation of the ammonia from the brine, for example in gaseous form. A commercially available scrubber product can be used for this purpose (Model N for Nitric or S for sulfuric 300, manufactured by BluMetric Environmental). Backwash 50 from the separator 150 is returned into the CAT 110. Active biomass 60 and other solids contained in the retentate in the MBR 120 is split between a return feed to the CAT 110 and a disposal feed 62 into the solids treatment arrangement 400. The latter includes a stabilization tank 210 (BluMetric Environmental), a feed pump 70 (Torontec), a filter press 200 (Torontec) and a collection bin 190 (BluMetric Environmental). The disposal feed 62 is guided into the stabilization tank 210 to allow settling out of the solids. Settled solids 70 reclaimed from the stabilization tank 210 are pushed by the feed pump 220 to the filter press 200 in which they are dewatered. The resulting dewatered sludge 80 is then collected in the bin 190 for environmentally safe disposal. Filtrate 91 from the filter press 200, liquid overflow or decant 90 from the stabilization tank 210 and return activated sludge 92 from the stabilization tank 210 are returned into the CAT 110.

Figure 2:
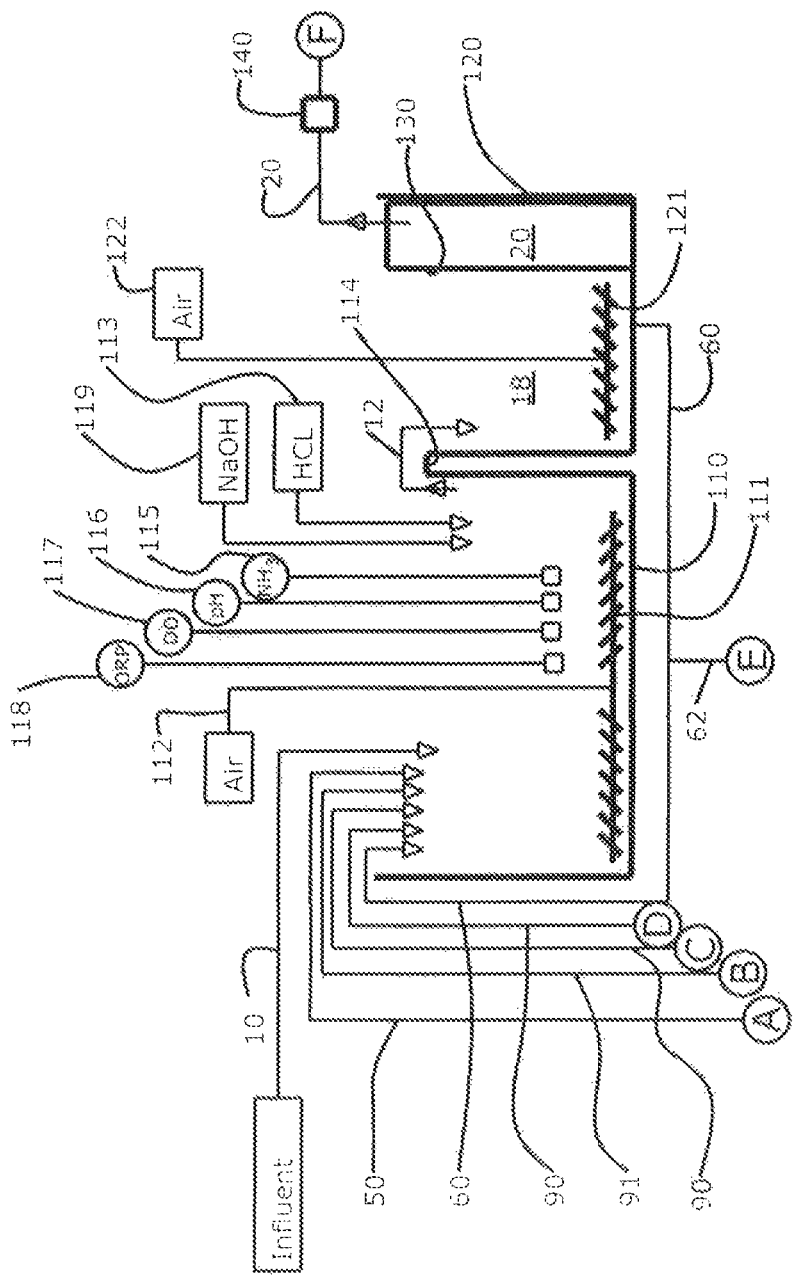
FIG. 2 schematically illustrates in more detail the CBOD reduction and partially treated wastewater separation steps of the process of FIG. 1.
Figure 3:
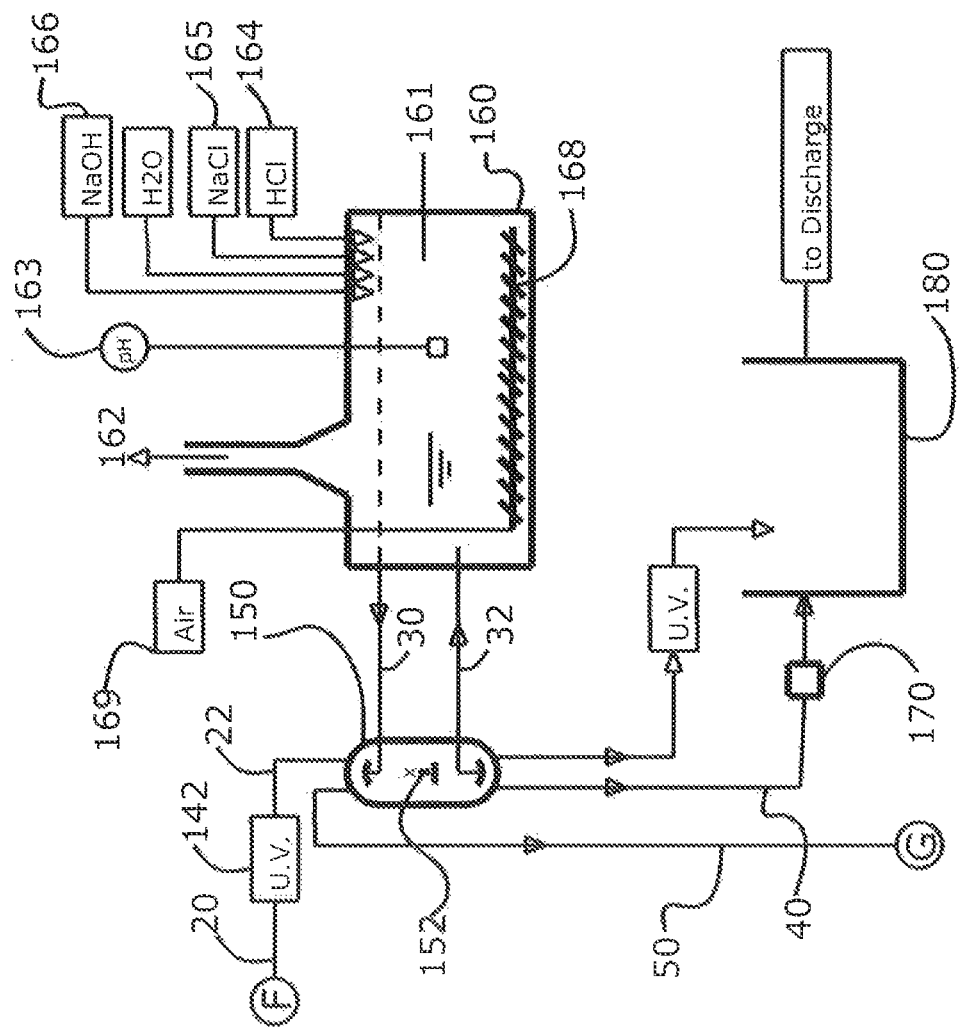
FIG. 3 schematically illustrates in more detail the ammonia separation and disposal steps as well as the ion-selective resin reconstitution steps of the process of FIG. 1.
Figure 4:
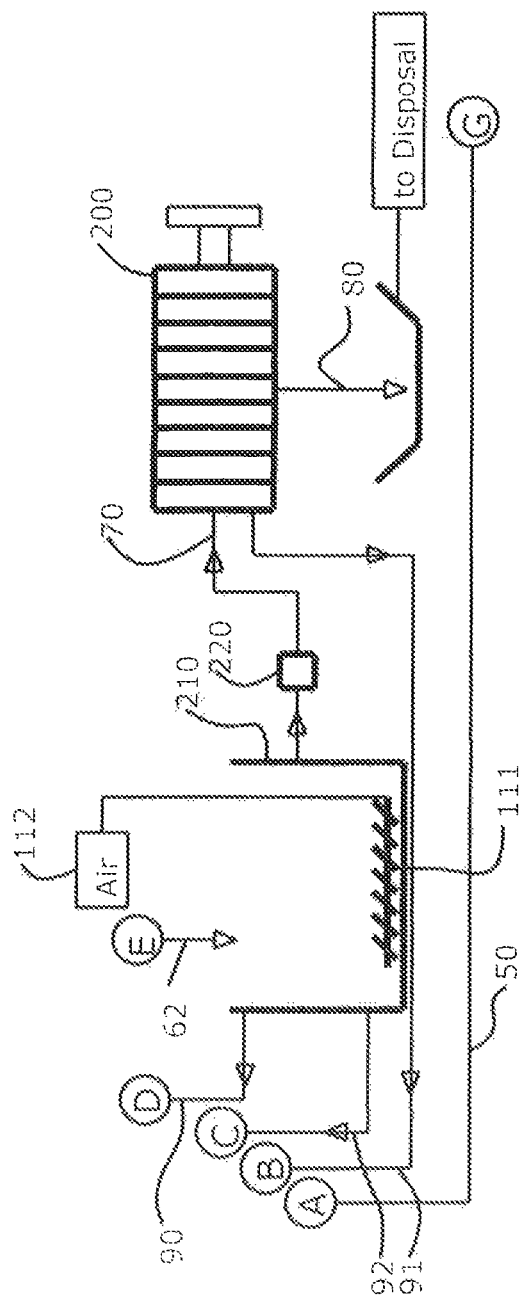
FIG. 4 schematically illustrates in more detail the sludge treatment step of the process of FIG. 1.

In the present process as illustrated schematically in more detail in FIGS. 2 to 4, wastewater 10 including carbonaceous and nitrogenous contaminants is conveyed from its point of generation to the CAT 110. Here the incoming wastewater 10 is mixed with return activated biomass 60 rejected by the downstream membrane 130. This active biomass 60 rapidly absorbs the soluble carbonaceous contaminants and uses them as food to generate additional cell mass, while producing carbon dioxide and water as byproducts. At this point in the process the system operates similar to a contact stabilization reactor, which accounts for the rapid absorption of the CBOD.

In order to enhance the process, the pH is closely monitored by way of a pH sensor 116 and adjusted to 7.5 to 8.0 to buffer the reduction caused by the production of carbon dioxide and the resultant weak acid. To obtain an even higher degree of ammonia removal the pH of the reaction mixture is preferably adjusted to about 7, because at that pH more of the ammonia will be present in the form of NH4 ammonium which is more susceptible to adsorption by the ion exchange resin. Buffering is carried out by supplying base or acid from the acid reservoir 113 or the base reservoir 119. The oxidation reduction potential (ORP) is also measured by way of the ORP sensor 118, as a method to gauge the uptake of the CBOD, along with the dissolved oxygen (DO), by way of DO sensor 117, to ensure the CAT 110 remains aerobic. The ammonia concentration is monitored by way of ammonia sensor 115, to make sure the activated sludge is only reducing the CBOD and not nitrifying or oxidizing the ammonia. The CAT 110 further has an aeration arrangement including an aeration boom 111 and an air pump 112 for aggressive aeration of the CAT 110 to supply sufficient oxygen to maintain a dissolved oxygen concentration of at least 2.0 mg/l. Moreover, the aggressive aeration is used to adequately mix the contents to maintain the incoming food in contact with the biomass.

The CAT 110 operates similar to the Activator tank in the conventional Variable Depth reactor (VDR) as it serves as an entry point for secondary wastewater flows. Return activated biomass or sludge (RAS) 60 is recycled from the membrane bioreactor (MBR) 120 and represents the active biomass that initiates the biological absorption process. Decant 90 from the sludge holding tank 210, filtrate 91 from the dewatering press 200, return activated sludge 92 from the stabilization thank 210 and backwash 50 from the resin are returned to the CAT 110 for additional processing.

The conditioned mixed liquor 12 overflows from the CAT 110 past the overflow gate 114 to the MBR 120. The MBR 120 further has an aeration arrangement including an aeration boom 121 and an air pump 122 for aggressive aeration of the mixed liquor to distribute it across the face of the membranes 130 and scour deposited biomass off of the membrane surface. The membranes 130 are constructed from a synthetic semi-permeable flat sheet, which has a series of openings between 0.1 and 0.2 microns in diameter and on average about 0.15 microns. These openings will allow clear water and dissolved contaminants, such as ammonia, to pass through, but retain and reject suspended solids of at least 0.1 micron diameter, including the activated biomass 60. Conventional MBR type treatment plants operate in this fashion, but do not have as the objective the segregation of ammonia. Most MBR plants have nitrate segregation as the objective, since they are downstream of the traditional activated sludge/nitrification process and reject the biomass, but allow nitrate to pass through. In the present system the hydraulic residence time in the CAT 110 has been reduced to the point where nitrification is substantially prevented, allowing the use of the MBR 120 for ammonia separation instead.

The present process controls the CBOD reduction by monitoring ORP and ammonia concentration, so that water low in CBOD, but containing dissolved ammonia can be pulled through the membrane 130 by conveyor pump 140. This approach accomplishes the first step in contaminant removal, which is the reduction of CBOD.

The permeate 20 from the membrane 130 will be devoid of suspended solids and have a relatively low concentration of soluble CBOD, but will contain soluble ammonia. This clear, partially treated wastewater will then pass through a Ultra-violet disinfection unit 142 (see FIG. 2) to kill all of the microorganisms present in the permeate 20 to prevent biological fouling of the downstream resin. The disinfected wastewater 22 will then pass through a separator tank 150 containing ion-selective synthetic resin beads 152 that will remove the ammonia by adsorption. The resin exchanges sodium ions for ammonia ions in a fashion similar to a conventional water softener. The resin is initially loaded with a brine solution that deposits sodium ion on the surface of the resin. These ions are held in place by an electrostatic charge. As the ammonia laden water 22 passes over the resin 152, the ammonia ion has a greater affinity or attraction to the resin and displaces the weakly held sodium ion. Consequently, wastewater containing 25 mg/l of ammonia, for example, would pass through the resin and exchange the ammonia for 25 mg/l of sodium, so the effluent from the resin would have <1.0 mg/l of ammonia and 25 mg/l of sodium, which will not create a problem for the environment.

Over a period of time the resin 152 will load up with ammonia and require regeneration, which is accomplished by passing a concentrated brine solution 30 back through the resin. The concentrated brine overcomes the electro-static adhesion of the ammonia ion and displaces it with a sodium ion, so the process can start over. The spent brine solution 32, now laden with ammonia is returned to the scrubber 160. Here the pH is raised to over 10.5, which changes the dissolved ammonium ($NH_4$) to the more volatile form of ammonia ($NH_3$). To monitor the pH in the scrubber sump 161, the scrubber 160 includes a pH sensor 163. Adjustment of the pH is carried out by supplying base or acid from the acid reservoir 164 or the base reservoir 166 as needed according to the actual pH measured by way of pH sensor 163. Additional brine can be supplied from brine reservoir 165. The scrubber 160 further has an aeration arrangement in the scrubber sump 161, which arrangement includes an aeration boom 168 and an air pump 169 for aggressive aeration of the sump 161 to strip the ammonia from the brine. The ammonia will exit the system as a gas 162 and the brine will be retained and reused after the pH has been returned to the near neutral.

Ammonia laden off-gas 162 exiting the scrubber can be passed through an ammonia re-claimer (not shown), which uses either sulfuric acid or nitric acid to capture the ammonia and bind or convert it to ammonium sulfate or ammonium nitrate. The residual ammonium sulfate or ammonium nitrate solution from the re-claimer can be recycled to the chemical processing industry or the fertilizer industry for beneficial reuse.

Surplus biomass generated by the conversion of the CBOD will be wasted from the system as Waste Activated Sludge (WAS) 62 and handled in a traditional fashion, with the water liberated by the digestion and dewatering process being returned to the Contact Activator tank for further processing.

Figure 5:
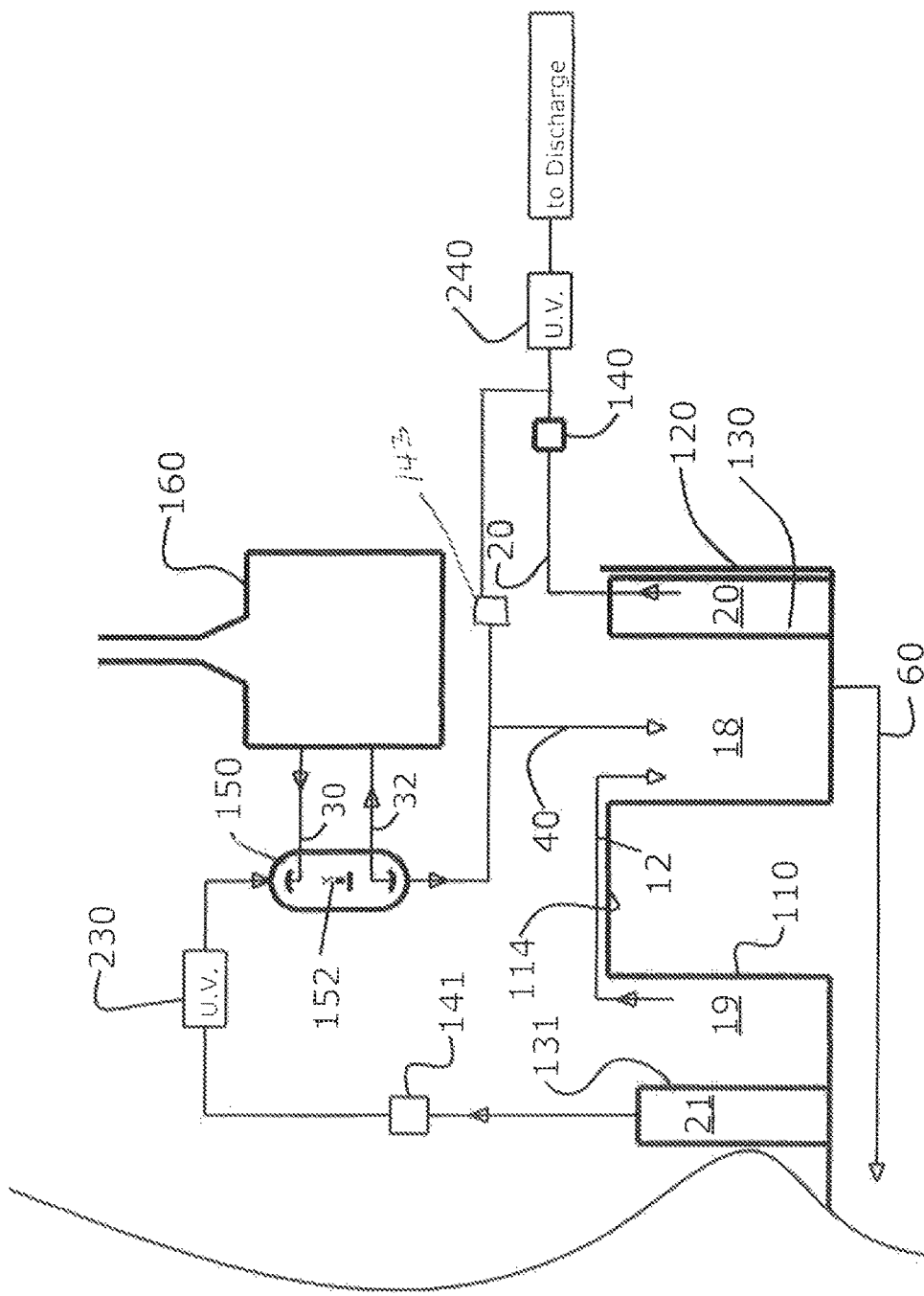
FIG. 5 schematically illustrates an $NH_3$ interceptor arrangement for the contact activation tank of the process of FIG. 1.

In a modification of the basic process and system of FIG. 1, the system includes an additional separator, which functions as a NH3 interceptor arrangement for the contact activation tank, as schematically illustrated in FIG. 5. Rather than including only a single separation membrane 130 in the MBR 120, this modified embodiment includes dual separating membranes, namely the separating membrane 130 in the MBR 120 and an additional separating membrane 131 in the CAT 110. The pore size of the second separating membrane 131 can be selected to be the same as or larger than that of the first separating membrane 130. Although the hydraulic residence time in the CAT 110 is controlled for substantially preventing nitrification of the nitrogenous contaminants in the reactor, some nitrification may nevertheless occur at high ammonia levels in the reactor. Thus, the additional separating membrane 131 is used in order to lower the level of ammonia in the CAT 110. The additional separating membrane 131 produces a retentate 19, the liquor portion 12 of which overflows into the MBR 120 as in the basic system, and a permeate 21 which is fed by a second conveyor pump 141 into the separator 150 and scrubber 160 of the basic system. However, contrary to the basic system, the treated wastewater 40 exiting the separator 150 is fed into the MBR 120 for further solid/liquid separation. A portion of the treated wastewater may also be discharged through pump 143. Moreover, prior to entry into the separator 150, the permeate 21 is passed through a first U.V. treatment unit 230 to deactivate any microbial load in the permeate 21. The permeate 20 from the separator membrane 130 in the MBR 120 is then removed by the conveyor pump 140 and, contrary to the basic system in which it is conveyed to the separator 150, is passed through a second U.V. treatment unit 240 and discharged from the system as fully treated wastewater without any further treatment.

Figure 6:
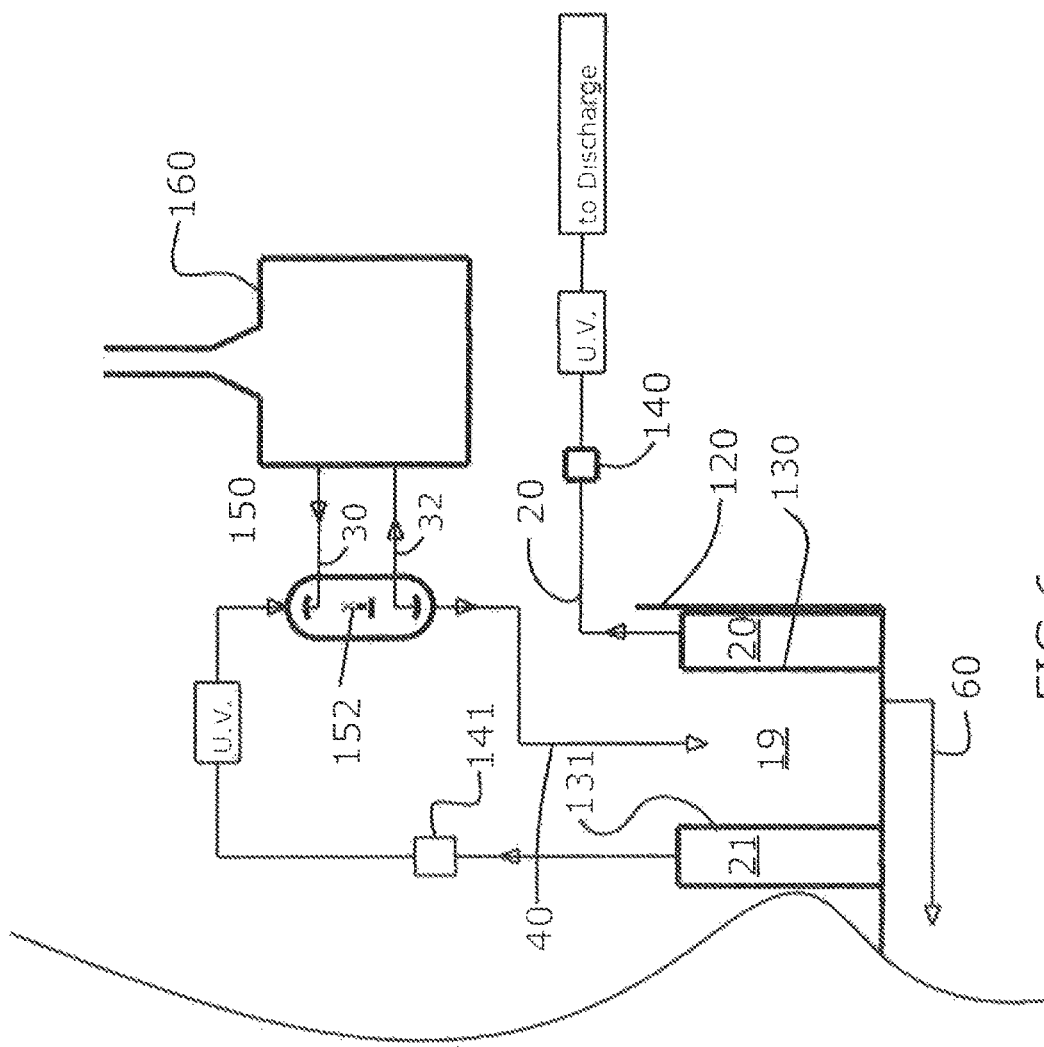
FIG. 6 schematically illustrates in more detail a modified membrane reactor arrangement for the process of FIG. 1.

In another dual separator modification of the basic process and system of FIG. 1, the system includes a modified membrane reactor arrangement as schematically illustrated in more detail in FIG. 6, and including dual separator membranes. Rather than including only a single separation membrane 130, in this modified embodiment the MBR 120 includes the separating membrane 130 as well as an additional separating membrane 131. The pore size of the second separating membrane 131 can be selected to be the same as or larger than that of the first separating membrane 130, as long as a permeate with dissolved ammonia is created. The additional separating membrane 131 is used to separate the nitrogen load from the carbon load. The additional separating membrane 131 produces a retentate 19 and a permeate 21 which is fed by a second conveyor pump 141 into the separator 150 and scrubber 160 of the basic system. However, contrary to the basic system, the treated wastewater 40 exiting the separator 150 is fed back into the MBR 120 for further solid/liquid separation prior to disposal to the environment. Moreover, prior to entry into the separator 150, the permeate 21 is passed through a first U.V. treatment unit 230. The permeate 20 from the separator membrane 130 in the MBR 120 is then removed by the conveyor pump 140 and, contrary to the basic system in which it is conveyed to the separator 150, is passed through a second U.V. treatment unit 240 and discharged from the system as fully treated wastewater without any further treatment.

Figure 7:
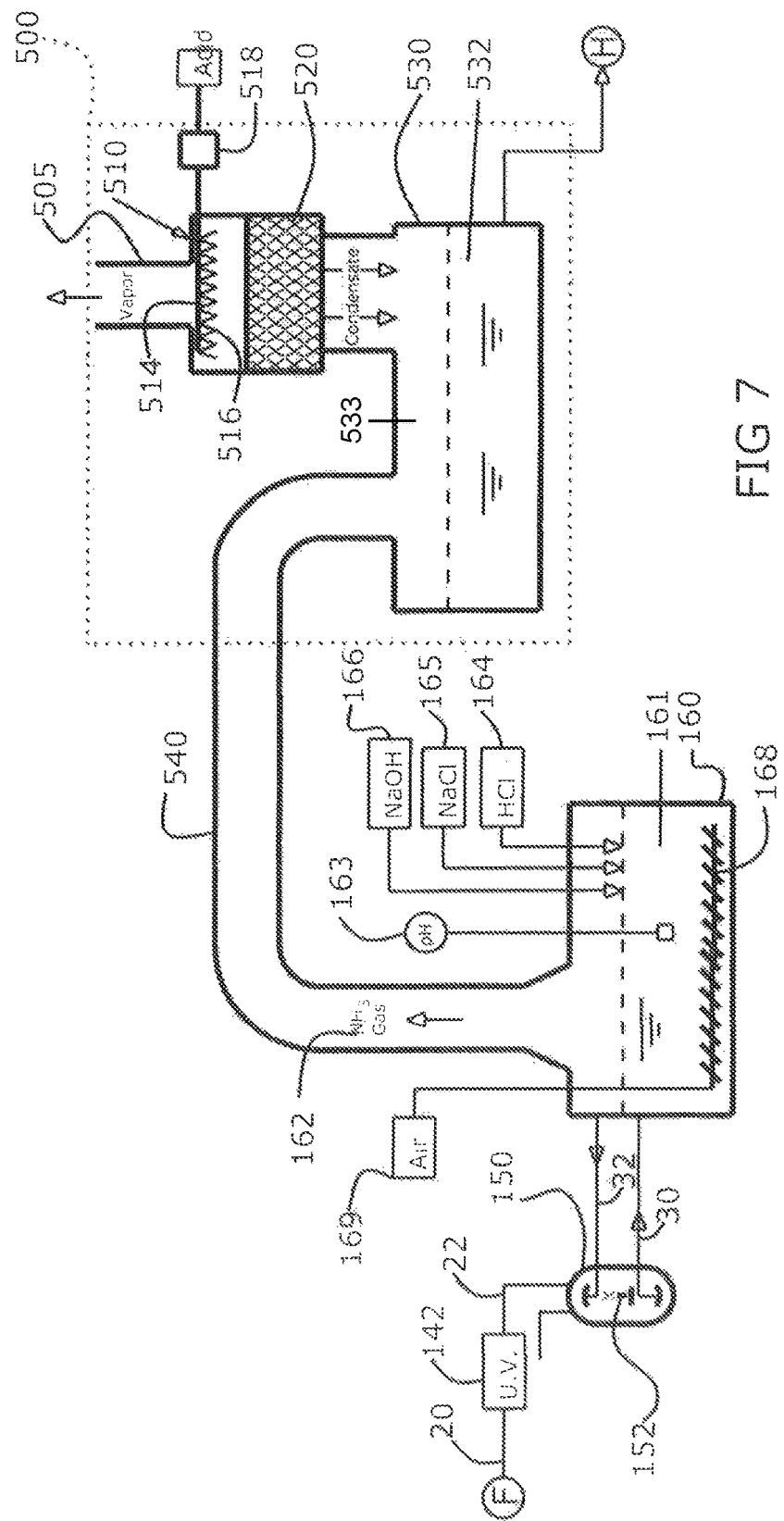
FIG. 7 schematically illustrates a scrubber and reclaimer combination for use in the process of FIG. 1.

In still a further modification of the basic process and system of FIG. 1, the ammonia separation arrangement 300 of the system includes a scrubber and reclaimer combination as schematically illustrated in FIG. 7. In addition to the scrubber 160 as described above in detail in connection with FIG. 3, the separation arrangement further includes a reclaimer 500 with a scrubbing section 510 and a connecting conduit 540 for guiding the ammonia gas 162 exiting the scrubber 160 directly to the reclaimer 500. Thus, rather than releasing the ammonia gas 162 to the environment as in the basic system of FIGS. 1 and 3, in this modification the ammonia gas generated in the scrubber is captured to avoid its release to the environment. The reclaimer 500 includes the scrubbing section 510, a condensate reservoir 530 and an exhaust 505. The condensate reservoir 530 is partially filled with condensate 532 and includes a headspace 533 connected to both the conduit 540 and the scrubbing section 510. The ammonia gas 162 passes through conduit 540 into the headspace 533 and from there into the scrubbing section 510. In the scrubbing section 510, the ammonia gas 162 is exposed to acid, preferably nitric acid or sulfuric acid, which is sprayed by spray pump 518 into the scrubbing section 510 through an acid boom 514 with spray nozzles 516. In order to maximize the contact surface of the acid with the ammonia gas 162, the scrubbing section 510 further includes a contact media 520. The acid is sprayed onto the contact media 520 and the ammonia gas 162 is passed through the acid wetted contact media 520 for the generation of ammonium nitrate solution or ammonium sulfate solution. The solution generated then flows under the influence of gravity to the lower end of the contact media 520 from which is drips into the condensate reservoir. After removal of the ammonia from the ammonia gas 162, the scrubbed gas which is exhausted from the reclaimer includes mainly air and vapor. Sufficient condensate is withdrawn from the reservoir 530 to maintain a preselected level of condensate in the reservoir and supplied to chemical or fertilizer industry for use of the ammonium nitrate or sulfate in the condensate.

Figure 8:
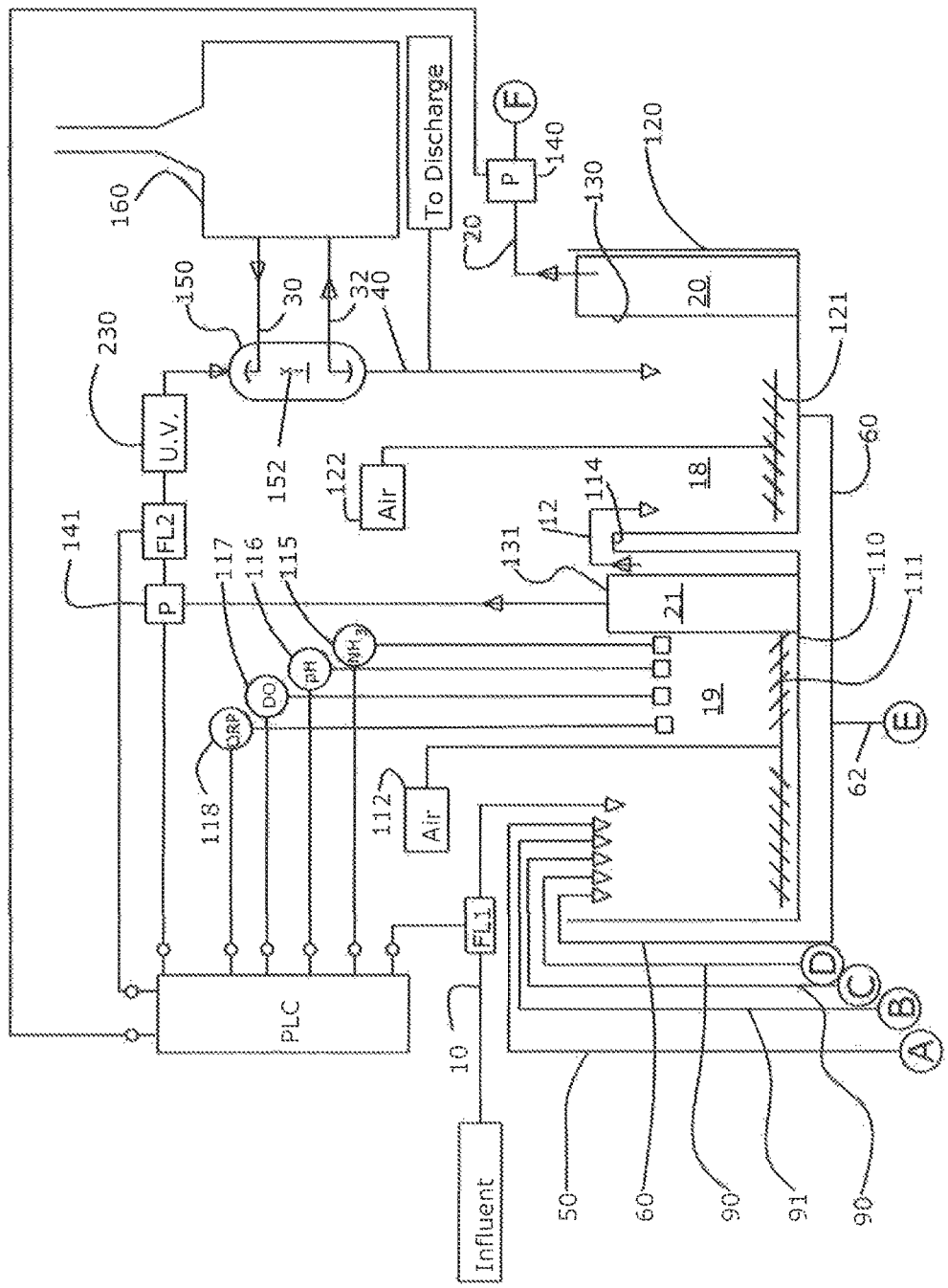
FIG. 8 schematically illustrates the PLC controller arrangement in a dual separator system as shown in FIG. 5.

In the dual separator version of the present system as illustrated in FIG. 5, a PLC is used to control operation of the system. As schematically illustrated in FIG. 8, the PLC receives data from the pH, DO, ORP and NH3 probes, and from flow meters FL1 and FL2. The PLC is further connected to pumps 140 and 141 for individual control of each pump and, thus, the amount of liquid respectively conveyed by each pump. From the data received, the PLC calculates an amount of partially treated water which must be withdrawn from the reaction mixture for achievement of a preselected ammonia content in the reaction mixture required to minimize or prevent nitrification. The PLC then operates conveyor pumps 140 and/or 141 to achieve that flow, as determined from the flow data received from FL1 and FL2. The amount of overflow 12 from the CAT 110 into the VDR/MBR 120 is determined as the differential of the influent flow 10 as determined by FL1 and the interceptor flow 21 as determined by FL2. If the amount of overflow 12 is sufficient to achieve the desired hydraulic retention time in the CAT 110 and maintain the preselected ammonia content in the reaction mixture, the PLC keeps conveyor pump 141 inactive, but if the ammonia content is above the preselected level and/or is rising, the PLC will operate the conveyor pump 141 until the desired preselected level is achieved. The preselected ammonia content is chosen to be just sufficient for supporting microbial CBOD reduction. In general, the biomass needs some nitrogen as a nutrient for metabolism, normally approximately 5% of the organic load, so if the CBOD is 200 mg/l the biomass will need about 10 mg/l of ammonia. In a dual separator system, the PLC determines and controls the flow of water which must be removed from each separator. In a single separator system as illustrated in FIGS. 1 and 2, the PLC determines the amount of partially treated water which must be withdrawn and operates conveyor pump 140 to achieve the required flow. For example, the PLC will operate pump 140 to pull X volume units of partially treated water from the MBR 130 thereby withdrawing the same volume of water from the VDR 120, In the dual system as illustrated in FIG. 8, the PLC will operate pump 141 to withdraw X volume units of water from the CAT 110 and letting Y volume units of liquid, including water, ammonia, biomass and CBOD, pass from the CAT 110 to the VDR 120 as overflow 12 over the divider 114, for reduction of the CBOD in the VDR 120, whereby X+Y=volume of inflow and the volume of liquid passing into the VDR 120 being controlled by the PCL through operation of pump 141.

EXAMPLE

A pilot test program was developed to determine the best manner to reduce the oxygen demand created by wastewater generated from an existing wastewater management facility (Facility 1). Initial evaluation of the varied wastewater streams showed that certain streams carried the highest potential for effective reduction of both ammonia and BOD. An exemplary pilot system in accordance with the invention was constructed and tests were run to assess the efficacy of ion exchange resin at removing ammonia from blended landfill leachate water, as well as pre-treated process water. Following ammonia removal by ion exchange, BOD removal was tested using a 3:1 ratio of activated sludge from the Middletown Municipal Wastewater Treatment Plant (Middletown WWTP) to sample. BOD removal was tested on a blended landfill leachate stream, and a pretreated wastewater stream over varying time intervals, following contact with the ion exchange bed, as well as a sample of wastewater from a second facility (Facility 2), which was not treated by ion exchange, since it contained no ammonia. Experimental procedures, results, and a discussion of findings are presented in the subsequent sections and tables.

All samples were collected in clean, unused bottles provided by Alloway Laboratories. Sample bottles contained preservative as required, and were stored in a cooler on ice prior to analysis. Samples were collected following purging of sample ports, and while using clean nitrile gloves to ensure representative samples were collected.

Ion Exchange Testing

Figure 9:
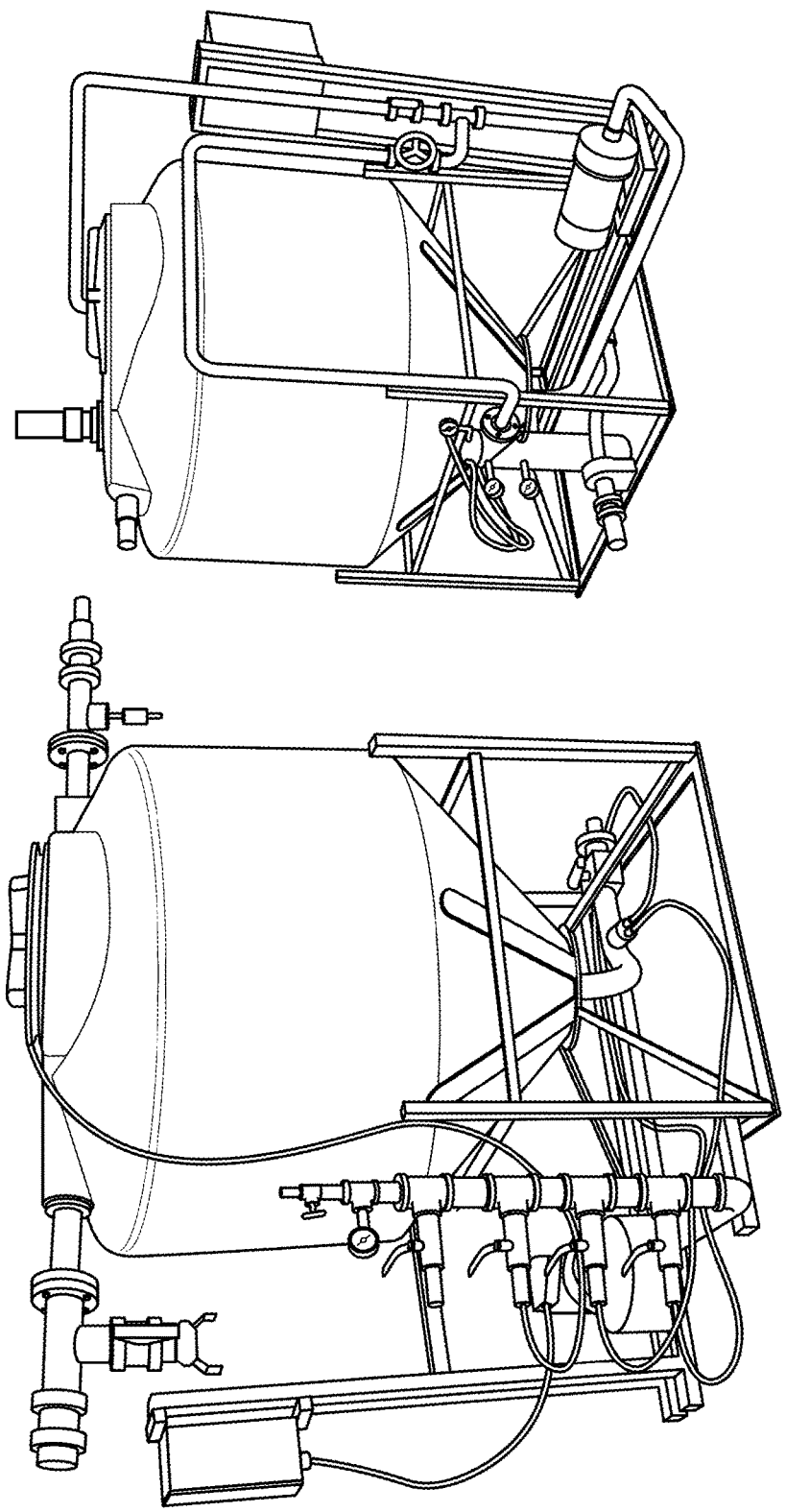
FIG. 9 is an image of an Ion Exchange component of an exemplary pilot system in accordance with the invention as discussed in the Example.

The ion exchange component testing was conducted in an Ion Exchange Pilot component as shown in FIG. 9 and using two conical bottomed, 250 US Gallons (USG) HDPE tanks, a transfer pump, interconnecting plumbing, distribution/collection headers, flow control valves, clean crushed gravel, and 18 ft3 of an ammonia selective ion exchange resin (I-X resin).

The ion exchange column (left tank in FIG. 9) was prepared by loading 3 ft3 of gravel followed by 18 ft3 of ion exchange (I-X) resin, and rinsing the fines out of the system. Prior to running a test, the water was drained from the ion exchange resin and gravel, and a 250 USG batch of the water to be tested was pumped into the regen/batching tank (right tank in FIG. 9). The batch was aerated to ensure it was heterogeneous, and a sample was collected for laboratory analysis. Next the water was pumped in a loop, flowing up through the ion exchange resin, and overflowing back into the batch tank. The ion exchange reaction step was carried out at approximately 15 USG/minute for approximately 60 minutes, to allow all of the water to pass through the resin 3-4 times. After reaction with the ion exchange resin, the resin tank was pumped back in to the batch tank, aerated to homogenize, and sampled. Ion exchange tests were performed on landfill leachate streams, and processed wastewater from the Facility 1.

Membrane Bioreactor Testing

Figure 10:
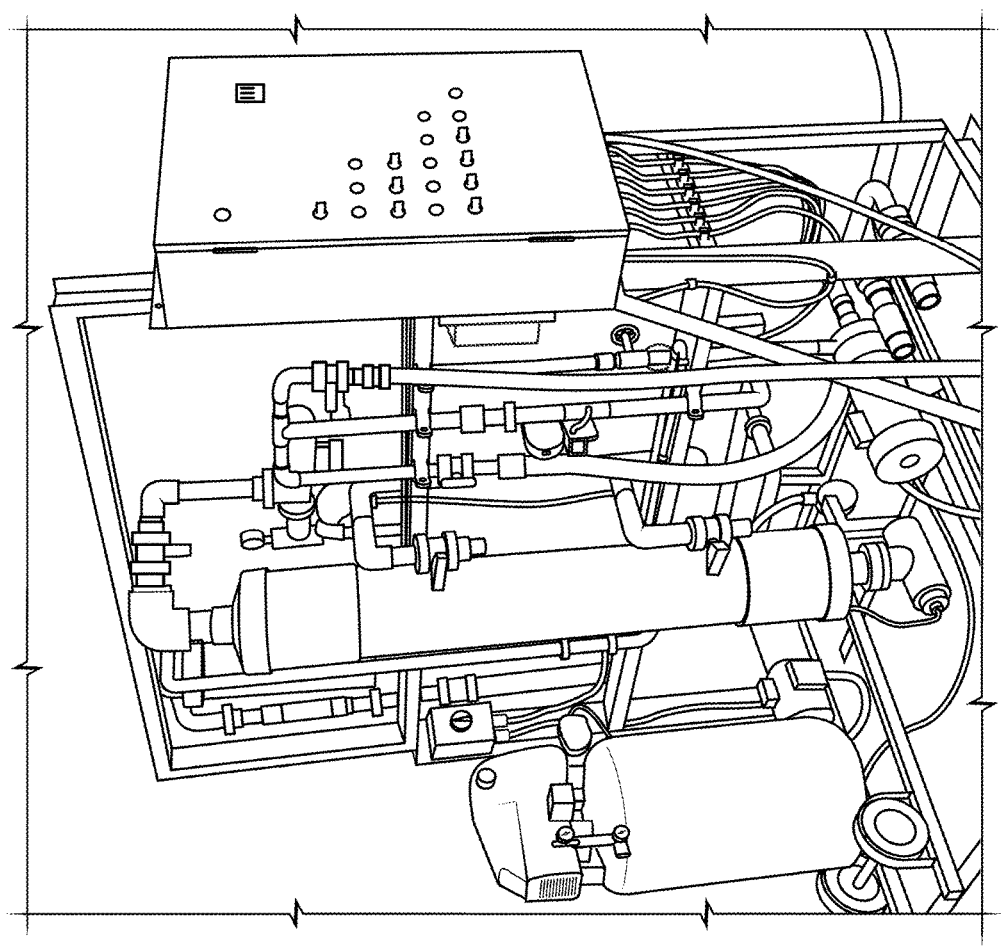
FIG. 10 is an image of a Membrane Bioreactor component of the exemplary pilot system as discussed in the Example.

The membrane bioreactor (MBR) component testing was conducted in a Membrane Bioreactor component as shown in FIG. 10 and including a 800 USG HDPE tank, which served as the bioreactor as well as a pressurized hollow fibre microfilter (MF), which served as the membrane. A blower for air in the bioreactor, and to backwash the membrane as well as interconnecting pumps, gauges, and tubing were also necessary to run the MBR. The MBR setup is shown in FIG. 10, with the pressurized hollow fibre MF, and control skid in the front, and HDPE bioreactor tank in the back.

All MBR tests were conducted using 300 USG of activated sludge from the Middletown WWTP, as well as 100 USG of wastewater from the landfill. Tests were conducted on leachate, processed water, and wastewater from Facility 2, and were conducted following ion exchange when ammonia levels were high, or alone, when ammonia numbers were low. Following aeration for a chosen period, the microfilter was run, while diverting both filtrate, and concentrate back to the MBR, so that a representative sample of permeate, showing dissolved BOD and ammonia concentrations could be collected for analysis.

On-Site Analytical Testing

Samples were analyzed on-site for pH, TDS, and conductivity using a Hannah™ pH/conductivity probe. Dilutions of samples were often performed, since conductivities often fell above the instrument limit of 4000 µS/cm.

Hardness was measured using a HACH™ digital titration hardness kit, and ammonia concentrations were measured using a HACH DR 2800™ spectrophotometer, as well as Test N Tube High Range ammonia reagents. In both cases, dilutions were performed to minimize interference of coloured species, and dissolved solids.

Evaluation of the Wastewater Streams

The wastewater received by Facility 1 is derived from a number of clients with the bulk of those clients falling into four groups, which are defined in the following table:

TABLE 1

Client Information

| Client | BOD pounds per day | NH3 pounds per day | Theoretical O2 demand BOD/d | Theoretical O2 demand NH3/d | Total field O2 demand for BOD & NH3 |
|---|---|---|---|---|---|
| Group 1 | | | | | |
| 1-A | 0.20 | 0.06 | 0.24 | 0.28 | 0.78 |
| 1-B | 0.27 | 0.05 | 0.33 | 0.23 | 0.84 |
| 1-C | 0.76 | 0.03 | 0.91 | 0.14 | 1.58 |
| 1-D | 2.47 | 0.48 | 2.96 | 2.26 | 7.83 |
| 1-E | 1.55 | 6.41 | 1.86 | 30.13 | 47.99 |
| Total Group 1 | 5.25 | 7.03 | 6.30 | 33.04 | 59.02 |
| Group 2 | | | | | |
| 2-A | 56.24 | 45.54 | 67.49 | 214.04 | 422.30 |
| 2-B | 402.02 | 110.07 | 482.42 | 517.33 | 1499.63 |
| 2-C | 260.20 | 157.51 | 312.24 | 740.30 | 1578.81 |
| 2-D | 1259.57 | 344.86 | 1511.48 | 1620.84 | 4698.48 |
| Total Group 2 | 1978.03 | 657.98 | 2373.63 | 3092.51 | 8199.22 |
| Group 3 | | | | | |
| Process WW | 4564.48 | 351.11 | 5477.38 | 1650.22 | 10691.4 |
| Group 4 | | | | | |
| 4-A | 1425.64 | 0.00 | 1710.77 | 0.00 | 2566.16 |

Based on the above, the determination was made to focus on Group 2 with ammonia and BOD removal technology, then Group 3 as it represented the second highest removal potential and then finally on Group 4.

TABLE 2

Samples Collected

| Sample | Description |
|---|---|
| S-1 | Proportionally mixed leachates from Group 2 |
| S-2 | Leachate from S-1 after one bed volume through ion exchange (I-X) |
| S-3 | Leachate from S-1 after three bed volumes through I-X |
| S-4 | Facility 1 process wastewater |
| S-5 | Leachate from S-1 after I-X and mixed with RAS 1:3 |
| S-6 | Membrane permeate of S-5 |
| S-7 | Facility 1 process wastewater after three bed volumes through I-X |
| S-8 | Membrane permeate from IX leachate from S-1 aerated for 24-hours with RAS |
| S-9 | Proportionally mixed leachate from 2-C and 2-D |
| S-10 | Facility 1 processed wastewater after I-X and mixed with RAS |
| S-11 | Leachate from S-10 after three bed volumes through I-X |
| S-12 | Membrane permeate of S-10 after I-X and aeration for 24-hours with RAS |
| S-13 | Membrane permeate of S-10 after I-X and aeration for 48-hours with RAS |
| S-14 | New of fresh batch of Facility process wastewater |
| S-15 | Membrane permeate of S-14 after 2-hours of aeration with RAS |
| S-16 | Facility 2 wastewater |
| S-17 | Membrane permeate of S-16 after 21-hours of aeration with RAS |

In addition to ammonia and BOD, the test results shown in the attached table include data for metals, hardness, conductivity, TDS, sulfates, FOG, PO4, TSS, etc., which were collected for evaluating interfering compounds and metals that may be problematic. The samples were collected and labeled in the sequence they were generated. As described above, the pilot had multiple steps and the effluent from one step became the influent for another step, but there was often a delay in the collection of a sample due to the time it took to process the wastewater in the bioreactor, so some samples appear out of sequence. In order to simplify the presentation the following tables segregate the progression of the samples and focuses on ammonia and BOD removal.

TABLE 3

Leachate Streams

|  | S-1 (Raw 1) | S-3 (1-X) | S-5 | S-6 | S-8 | S-9 (Raw 2) |
|---|---|---|---|---|---|---|
| Ammonia mg/l | 2360 | 359 | 97 | 87 | 87 | 3640 |
| BOD | 2100 | 1700 | 750 | 180 | <600 | 5400 |
| COD | 6440 | 5460 | 8380 | 960 | 735 | 10200 |
| COD:BOD ratio | 3.05:1.0 | 3.21:1.0 | 11.17:1.0 | 5.33:1.0 | — | 1.89:1.0 |

The blended leachate streams had an ammonia concentration of 2360 mg/l and the I-X reduced it to 359 mg/l or by approximately 85%. Biological uptake of ammonia, as a nutrient, by the RAS in S-5 further reduced the ammonia from 359 mg/l to 97 mg/l. Sample S-6 indicates a slight reduction in ammonia, which was expected with a soluble BOD in the 180 mg/l range. The I-X was not designed to reduce BOD, so the modest 20% reduction between S-1 and S-3 was expected. The biological and membrane portion of the pilot reduced the BOD from 1700 mg/l to 180 mg/l. The overall ammonia reduction was from 2360 mg/l to 87 mg/l or 97%. The BOD reduction was from 2100 mg/l to 180 mg/l or 93%. To put this in perspective, an untreated leachate flow of 50,000-gpd, with the ammonia and BOD concentration shown in Table 3, will generate a field O2 demand of 8580 pounds per day. Based on the data above, a treatment system incorporating the technology used in the pilot system would reduce the field O2 load demand from 8580 pounds per day to 323 pounds per day. S-9 represented a proportioned sample of the two strongest leachate streams to serve as a benchmark for the previous test.

TABLE 4

Facility 1 Process Wastewater

|  | S-4 | S-7 | S-10 | S-12 | S-13 |
|---|---|---|---|---|---|
| Ammonia | 131 | 208 | 128 | 139 | 138 |
| BOD | 1900 | 3800 | 680 | <600 | <600 |
| COD | 10100 | 8120 | 7480 | 896 | 600 |
| COD:BOD ratio | 5.31:1.0 | 2.14:1.0 | 11.0:1.0 | <1.5:1.0 | <1.0:1.0 |

The process wastewater had a comparatively low ammonia concentration of 130 mg/l compared to 2360 to 3640 mg/l for the leachate streams. Based on the ammonia results in Table 3 and 4, it appeared that the ion exchange resin approached a point of diminishing return between 87 mg/l and an 138 mg/l. This maybe was a result of the need to lower the pH to ensure that all of the ammonia is in the NH3 form to be readily adsorbed on the resin.

The BOD reduction from 1900 mg/l to <600 mg/l is respectable, but unfortunately the laboratory's dilution put the detection limit at 600 mg/l. It is reasonable to expect a more significant BOD reduction. The progressive reduction in COD (94%) should have had a comparable reduction in BOD. The S-13 results show a COD of 600 mg/l, which should equate to a BOD in the 300 mg/l range.

TABLE 5

Samples Collected

|  | S-4 | S-14 | Average |
|---|---|---|---|
| Ammonia | 131 | 109 | 120 |
| BOD | 1900 | 6300 | 4100 |
| COD | 10100 | 21400 | 15750 |
| COD:BOD ratio | 5.31:1.0 | 3.40:1.0 |  |

Based on the results, even with adjustment to the optimum pH the use of I-X resin will not significantly reduce the ammonia concentration in the Facility 1 process wastewater. However, the real benefit may result in introducing the process wastewater into a bioreactor downstream of the I-X resin where the BOD could be reduced by 90%+ and a portion of the ammonia, 5% of the BOD, could be consumed as a nutrient by the biomass. To illustrate this, in order to reduce 4100 mg/l of BOD to 300 mg/l the biomass would require 190 mg/l of ammonia for metabolism. As an example, a biological system could reduce the O2 field demand of 50,000-gpd flow of process water at a 4100 mg/l BOD and 120 mg/l ammonia by 3323 pounds per day.

TABLE 6

Facility 1 Process Wastewater with Ultra-Filtration

|  | S-14 | S-15 |
|---|---|---|
| Ammonia | 109 | 134 |
| BOD | 6300 | 1000 |
| COD | 21400 | 4230 |
| COD:BOD ratio | 5.31:1.0 | 4.23:1.0 |

This portion of the pilot system used an ultra-filtration membrane and a biological contact tank as a pre-treatment device to accomplish a rapid reduction of BOD and COD. This portion reduced the BOD by 84% and COD by 80%. Due to the size of the ammonia molecule and relative short hydraulic retention time, ammonia reduction was not expected or achieved.

TABLE 7

Wastewater from Client 4-A

|  | S-16 | S-17 |
|---|---|---|
| Ammonia | 1.8 | 171 |
| BOD | 18000 | 3600 |
| COD | 44200 | 6580 |
| COD:BOD ratio | 2.45:1.0 | 1.83:1.0 |

Ammonia was not an issue for Client 4-A. Thus, this portion of the pilot system used a biological treatment reactor, with 21-hours of retention time, followed by a membrane component. Despite the relatively high strength of the wastewater, the biological system was able to reduce the BOD by 80% and the COD by 85% in less than 24-hours, indicating the wastewater is readily biodegradable. Again to put this in perspective, the technology employed by the pilot could reduce the field O2 demand in 5000-gpd of this wastewater from 1407 pounds per day to 282 pounds per day.

Results

The pilot system in accordance with the invention treated wastewater from a Centralized Waste Treatment facility as a feed stock and on a combined landfill leachate stream with an ammonia concentration of 2360 mg/l was able to reduce the ammonia by 85% to 359 mg/l (see Table 3). The significant reduction in BOD noted in Table 3 and Table 4 are a result of biological activity in the MBR and indicate that the leachate and process water streams are readily biodegradable. Since RAS from the Middletown WWTP was used as mixed liquor in the MBR it further indicates that neither the leachate nor the process streams had a detrimental impact on the biomass. It should be noted that the biomass in the MBR was exposed to concentrations of Facility 1 wastewater at levels in excess of 70 times the dilutive impact seen by the Middletown WWTP. The biological reduction of BOD also included an additional reduction in ammonia as a result of nutrient demand for nitrogen in the biomass. The COD:BOD ratios of the leachate and process streams were consistent with wastewater known to be readily biodegradable. Further, the COD, like the BOD, had a down progression across the treatment steps.

The use of a high rate biological reactor followed by a membrane as a pre-treatment step dramatically reduced the BOD and COD in a relatively short period of time. It produced a permeate that would reduce the load to a downstream ammonia removal system. This conclusion lends itself to a smaller footprint and a more cost-effective solution.

The results of Table 7 indicate that the high strength wastewater from client 4-A was readily treated. The reduction of 80% to 85% of the BOD and COD in less than 24-hours proved the waste stream, at concentrations 200 times the expected dilutive effect at the POTW, is readily biodegradable and does not have a toxic impact.

In addition, ammonia removal by selective ion-exchange reached a point of diminishing return at a concentration around 100 mg/l at a pH of 7.8. It was found that a higher degree of ammonia removal could be achieved when the wastewater had a pH of 7.0, because 95% of the ammonia present was in the form of NH4 ammonium and more susceptible to adsorption by the ion exchange resin. The total dissolved solids (TDS) content in the leachate tested was extremely high, in excess of 15,000 mg/l. The high TDS also accounted for lower ammonia removal, as the chloride content in the high TDS water partially regenerated the resin by stripping off a portion of the adsorbed ammonia. Pilot work completed on wastewater with a relatively low chloride concentration showed ammonia removal from 45 mg/l down to less than 1 mg/l, which means the resin, if loaded properly, has the capacity to reduce ammonia down to these relatively low levels. Testing with the pilot system demonstrated that a system in accordance with the invention is capable of mass removal of the bulk of the ammonia in the treated sample and that the system of the invention has utility at least the in the treatment of domestic sewage with an ammonia concentration of approximately 50 mg/l. Furthermore, a pH reduction from 7.8 to 7.0 results in enhanced ammonia removal and ammonia removal by ion-exchange is impacted by TDS, especially at high chloride concentrations. Thus, in a preferred embodiment, the system further includes a conductivity probe Activator or biological pre-treatment tank and a conductivity meter. The conductivity readings are used to approximate the TDS concentration for adjustment of the flow rate to the ion-exchange portion of the invention.

The ion-exchange component in the exemplary pilot system was followed by an aerobic biological treatment component, which further reduced the ammonia by using it as a nutrient. The second portion of the pilot used an aerobic biological pre-treatment step to rapidly absorb the BOD into cell mass without oxidizing ammonia to nitrite or nitrate. This biological step is followed by an ultra-filtration membrane to retain the aerobic biological floc/organisms. The test results show that the BOD was reduced by absorption and biological oxidation, but the ammonia passed through the membrane. In accordance with the invention, BOD was trapped in the biological floc and segregated from the forward flow by using the membrane, while allowing the ammonia to pass through the membrane to be removed by downstream ion-exchange. The use of an Activator tank, as part of a VDR, accomplished this goal, thereby reducing the footprint, complexity, and cost of traditional activated sludge/nitrification/de-nitrification processes.

The aerobic biological pre-treatment reactor achieved substantial BOD reduction in approximately 60-minutes and reduced the BOD without oxidizing the ammonia and allowing it to pass through the membrane. Thus, in a preferred embodiment, the system of the invention further includes an ammonia probe downstream of the ion-exchange resin for gauging an exhaustion rate of the resin. In another preferred embodiment, the system of the invention further includes a pH probe/controller for maintaining the pH at 7.0 to enhance downstream ammonia removal. The ORP probe can be used to approximate the COD and then develop a corollary to BOD, for establishing the nitrogen demand the biological system will require. This allows for manipulation of the ammonia removal to meet the nutrient demand through adjustment of the flow rate to the ion-exchange portion of the system.

It is to be understood that the invention is not limited to the exemplary embodiments contained in the present specification. The invention is capable of other embodiments and of being practiced or carried out in a variety of ways. It is to be understood that the phraseology and terminology employed herein are for the purpose of description and not of limitation and that the scope of the invention is limited solely by the wording of the claims.

What is claimed is:

1. A process for the treatment of wastewater containing carbonaceous and nitrogenous contaminants, comprising the steps of
    generating a reaction mixture by mixing the wastewater in a reactor with aerobic microorganisms capable of converting carbonaceous biological oxygen demand (CBOD) into carbon dioxide, water, and biological cell mass;
    supplying oxygen to the reaction mixture for supporting reduction of the CBOD by the aerobic microorganisms in the reaction mixture;
    controlling a hydraulic residence time of the nitrogenous contaminants in the reaction mixture for substantially preventing nitrification of the nitrogenous contaminants in the reaction mixture; and
    removing partially treated water with dissolved ammonia from the reaction mixture, while retaining the biological cell mass in the reaction mixture.

2. The process of claim 1, wherein the reaction mixture is treated in a variable depth reactor.

3. The process of claim 1, comprising the further step of separating the ammonia from the partially treated water to generate fully treated water and optionally recycling at least a portion of the fully treated water to the reactor.

4. The process of claim 3, wherein the ammonia is separated from the partially treated water by passing the partially treated water over an ion selective resin to bind the ammonia to the resin and generate the fully treated water and optionally recycling at least a portion of the fully treated water to the reactor.

5. The process of claim 1, comprising the further steps of
monitoring a pH in the reaction mixture; and
maintaining the pH in the reaction mixture at 7.0 to 8.0 to buffer a reduction caused by production of the carbon dioxide and acidification of the reaction mixture by dissolution of the carbon dioxide in the reaction mixture and
optionally washing the ion selective resin with a brine solution for reconstituting the resin and capturing the ammonia in the brine solution; and volatilizing the ammonia from the brine solution to generate ammonia gas.

6. The process of claim 5, comprising at least one of the further steps of venting the ammonia gas to the atmosphere and reclaiming the ammonia gas in the form of an ammonium sulfate or an ammonium nitrate solution.

7. The process of claim 5, comprising the further step of reclaiming the ammonia gas in the form of an ammonium sulfate or ammonium nitrate solution, optionally by using an ammonia scrubber to change a state of the ammonia at an elevated pH to permit volatilization of the ammonia.

8. A system for the treatment of wastewater containing carbonaceous and nitrogenous contaminants, comprising
a variable depth reactor for mixing the wastewater with aerobic microorganisms capable of converting carbonaceous biological oxygen demand (CBOD) into carbon dioxide, water, and biological cell mass and for supplying oxygen to the aerobic microorganisms for supporting reduction of the CBOD by the aerobic microorganisms in the reactor;
a hydraulic residence control for controlling the hydraulic residence time of the nitrogenous contaminants in the reactor to substantially prevent nitrification of the nitrogenous contaminants in the reactor; and
a separator for removing partially treated water with dissolved ammonia from the reactor, while retaining the biological cell mass in the reactor.

9. The system of claim 8, wherein the separator is a membrane bioreactor.

10. The system of claim 8, wherein the hydraulic residence control includes a sensor for monitoring a concentration of the nitrogenous contaminants in the reactor and a regulator for controlling a rate of withdrawal of the partially treated water from the variable depth reactor.

11. The system of claim 10, wherein the hydraulic residence control further includes an oxidation reduction potential (ORP) sensor and a dissolved oxygen (DO) sensor for assessing a rate of uptake of the CBOD and the system optionally further includes an ammonia separator for separating the ammonia from the partially treated water and generating fully treated water.

12. The system of claim 11, wherein the ammonia separator includes an ion selective resin for binding of the ammonia and generating the fully treated water.

13. The system of claim 12, wherein the ammonia separator further comprises
a reactor for washing the ion selective resin with a brine solution for reconstituting the resin and capturing the ammonia in the brine solution;
means for volatilizing the ammonia from the brine solution to generate ammonia gas; and
a conduit for releasing the ammonia gas to the atmosphere, or
an ammonia re-claimer for reclaiming the ammonia gas in the form of an ammonium sulfate or ammonium nitrate solution.

14. The system of claim 13, wherein the means for volatilizing comprises an ammonia scrubber to change a state of the ammonia at an elevated pH and volatilize the ammonia.

15. The system of claim 13, wherein the re-claimer is a nitric or sulfuric acid scrubber for capturing the ammonia gas in to form an ammonium sulfate or ammonium nitrate solution.

16. The system of claim 8, wherein the hydraulic residence control comprises
a flow meter for measuring an inflow volume of the wastewater into the reactor;
sensors for monitoring pH, oxidation reduction potential (ORP), dissolved oxygen (DO) and dissolved ammonia content (NH3) in the reaction mixture;
a pump for withdrawing partially treated water from the separator; and
a programmable logic controller (PLC) operably connected to the pump and connected to the sensors for data transfer, the PLC for calculating on the basis of data received from the sensors a minimum level of ammonia in the reaction mixture required for maintaining biomass respiration, and a required flow of partially treated water for maintaining the level of ammonia in the reaction mixture at about the minimum level of ammonia, the required flow being at most the inflow volume, and for operating the pump to achieve the required flow.

17. A process for the treatment of wastewater containing carbonaceous and nitrogenous contaminants, comprising the steps of
mixing the wastewater in a reactor with aerobic microorganisms capable of converting carbonaceous biological oxygen demand (CBOD) into carbon dioxide, water, and biological cell mass, creating a reaction mixture;
measuring an inflow volume of the wastewater into the reactor supplying oxygen to the reaction mixture for supporting reduction of the CBOD by the aerobic microorganisms in the reaction mixture;
monitoring pH, oxidation reduction potential (ORP), dissolved oxygen (DO) and dissolved ammonia content (NH3) in the reaction mixture;
calculating on the basis of the pH, DO and ORP a minimum level of ammonia in the reaction mixture required for maintaining biomass respiration, separating partially treated water containing dissolved ammonia from the reaction mixture, while retaining the biological cell mass in the reaction mixture, withdrawing a flow of the partially treated water and adjusting the flow of partially treated water to maintaining the minimum level of ammonia in the reaction for substantially preventing nitrification of the nitrogenous contaminants in the reaction mixture.

18. The process of claim 17, comprising the further step of separating the dissolved ammonia from the flow of partially treated water to generate fully treated water and recycle a portion of the fully treated water to the reaction mixture.

19. The process of claim 17, wherein the reaction mixture is created in a contact activator tank (CAT), the separating is carried out with a membrane bioreactor (MBR) and the method further includes creating an overflow from the CAT into a variable depth reactor (VDR).

* * * * *